UNITED STATES PATENT OFFICE.

HANS WIESINGER AND LUDWIG RISSMÜLLER, OF GOTTINGEN, GERMANY.

IMPROVEMENT IN TREATING RAGS FOR OBTAINING PAPER-STOCK AND FERTILIZERS.

Specification forming part of Letters Patent No. 206,158, dated July 16, 1878; application filed May 28, 1878.

*To all whom it may concern:*

Be it known that we, HANS WIESINGER and LUDWIG RISSMÜLLER, both of the city of Gottingen, Empire of Germany, have invented a new and useful Improvement in Treating Rags, &c., of which the following is a specification:

The object of our invention is to subject woolen rags, half-woolen rags, hair, &c., to such treatment that the nitrogenous matter contained therein will be separated from the cellulose, so that the former may be used for the manufacture of fertilizers, while the cellulose is utilized in the manufacture of paper, &c. This object we attain in the manner which we will now proceed to describe.

We first form a solution of lime-water by mixing, in suitable barrels, about four kilograms of lime with from two to three hundred (200 to 300) kilograms of water. We heat the solution by means of steam to a temperature of 100° centigrade, and then place in the barrel or barrels about fifty kilograms of the rags, &c., to be treated.

The contents of the barrel, by the continued admission of steam, are kept boiling, and are at the same time properly stirred about for from fifty to sixty minutes, when the rags, hair, &c., are removed from the hot liquid in the barrel. This liquid can be immediately used for the treatment of a new supply of rags, &c., by adding the proper quantity of lime.

The wet rags from the barrel are then pressed, so as to remove the superfluous solution contained in them, and are subsequently dried in a kiln. The dried mass resulting from this treatment consists mainly of two substances—namely, the nitrogenous material (woolen stuff and hair) and cellulose, (linen, cotton, &c.)

A small part of the nitrogenous substance of which the rags were composed will have been dissolved in the solution, and a still smaller portion will have escaped as ammoniacal gas. The cellulose will remain unaffected by the treatment.

The nitrogenous material and cellulose of which the dried mass consists are then mechanically separated from each other by any suitable apparatus. A flax-dressing machine or bone-grinding machine, provided with a movable sieve-bottom, may, for instance, be used for the purpose.

The nitrogenous material comes out in the form of a fine powder, while the cellulose remains unchanged. This nitrogenous powder is used in the manufacture of fertilizers, to supply the required quantity of ammonia, the powder having first been subjected to the action of sulphuric acid, in order to neutralize the lime. Almost all the nitrogen which was contained in the rags before treatment remains in this dried powder, for the portion of the nitrogen which has been absorbed by the boiling-mixture and that which has escaped as ammoniacal gas is comparatively of no moment.

The woolen substance is thus decomposed by the treatment with lime, so as to make it ready to be utilized in the manufacture of fertilizers.

The linen and cotton obtained by the above-described treatment can be used in the manufacture of paper in the same way as linen or cotton rags.

The advantages of our method of treating rags over the usual methods are that whereas formerly only a portion of the nitrogen was saved, and the cellulose partly or wholly lost, by our process, on the other hand almost all the nitrogen is saved, and all the cellulose is ready to be utilized in the manufacture of paper.

We claim as our invention—

The within-described method of treating rags, &c., for obtaining paper stock and fertilizing material—that is to say, subjecting the said rags to the action of hot lime-water, substantially as set forth.

In testimony whereof we have signed our names to this specification in the presence of two subscribing witnesses.

HANS WIESINGER.
LUDWIG RISSMÜLLER.

Witnesses:
CHRISTOPHER G. TIEDEMAN,
Dr. W. D. WAMER.